US012682166B2

(12) United States Patent
 Yu et al.

(10) Patent No.: US 12,682,166 B2
(45) Date of Patent: Jul. 14, 2026

(54) AUTO-SUGGESTION WITH RICH OBJECTS

(71) Applicant: Microsoft Technology Licensing, LLC, Redmond, WA (US)

(72) Inventors: Zhiwei Yu, Beijing (CN); Chin-Yew Lin, Redmond, WA (US); Xi Chen, Redmond, WA (US); Borje Karlsson, Beijing (CN); Jinge Yao, Beijing (CN); Shuang Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 18/562,905

(22) PCT Filed: May 23, 2022

(86) PCT No.: PCT/US2022/030463
 § 371 (c)(1),
 (2) Date: Nov. 21, 2023

(87) PCT Pub. No.: WO2023/278069
 PCT Pub. Date: Jan. 5, 2023

(65) Prior Publication Data
 US 2024/0265202 A1 Aug. 8, 2024

(30) Foreign Application Priority Data
 Jun. 30, 2021 (CN) .......................... 202110739558.1

(51) Int. Cl.
 *G06F 40/274* (2020.01)
 *G06F 40/169* (2020.01)
 (Continued)

(52) U.S. Cl.
 CPC .......... *G06F 40/274* (2020.01); *G06F 40/279* (2020.01)

(58) Field of Classification Search
 CPC .... G06F 40/274; G06F 40/279; G06F 40/169; G06F 9/453; G06F 40/216
 See application file for complete search history.

(56) References Cited

U.S. PATENT DOCUMENTS

| 8,239,413 B2 | 8/2012 | Hubert |
| 9,990,052 B2 | 6/2018 | Kuo |
| | (Continued) | |

FOREIGN PATENT DOCUMENTS

| CN | 109918555 A | 6/2019 |

OTHER PUBLICATIONS

"Data2Text: Automated Text Generation from Structured Data", accessed on link https://www.microsoft.com/en-us/research/project/data2text-automated-text-generation-from-structured-data/, Sep. 1, 2016, 2 pages.

(Continued)

*Primary Examiner* — Daniel C Washburn
*Assistant Examiner* — Penny L Caudle
(74) *Attorney, Agent, or Firm* — Schwegman Lundberg & Woessner, P.A.

(57) ABSTRACT

According to implementations of the subject matter described herein, a solution is proposed for auto-suggesting. In this solution, a trigger indication for suggesting is provided based on an input sentence. In response to the trigger indication being confirmed, a suggestion for the sentence is provided and the suggestion comprises one or more rich objects. In response to a selection of the suggestion, supplementary information for supplementing the sentence is provided based on at least one selected rich object. In this way, various auto-suggestions comprising rich objects may be provided, and thus rich supplementary information may be provided to supplement the input sentence to enhance the user experience.

15 Claims, 6 Drawing Sheets

600

160  610

We are in the Forbidden City ⌐?⌐

190

(51) Int. Cl.
    G06F 40/216     (2020.01)
    G06F 40/279     (2020.01)

(56)         References Cited

U.S. PATENT DOCUMENTS

| | | | |
|---|---|---|---|
| 10,514,833 B2 | 12/2019 | Kumar | |
| 10,698,604 B2 | 6/2020 | Badger | |
| 11,099,813 B2 * | 8/2021 | Kanuganti | .......... G06F 12/0223 |
| 2012/0297294 A1 | 11/2012 | Scott | |
| 2013/0179150 A1 | 7/2013 | Eriksson et al. | |
| 2015/0169537 A1 | 6/2015 | Corston | |
| 2017/0178530 A1 | 6/2017 | Twyman | |
| 2017/0308291 A1 | 10/2017 | Luipold | |
| 2020/0327555 A1 | 10/2020 | Sapoznik | |
| 2021/0073293 A1 | 3/2021 | Fenton et al. | |

OTHER PUBLICATIONS

International Search Report and Written Opinion Issued in PCT Application No. PCT/US22/030463, Sep. 9, 2022, 9 pages.
First Office Action Received for Chinese Application No. 202110739558.1, mailed on Mar. 16, 2026, 23 Pages. (English Translation Provided).

* cited by examiner

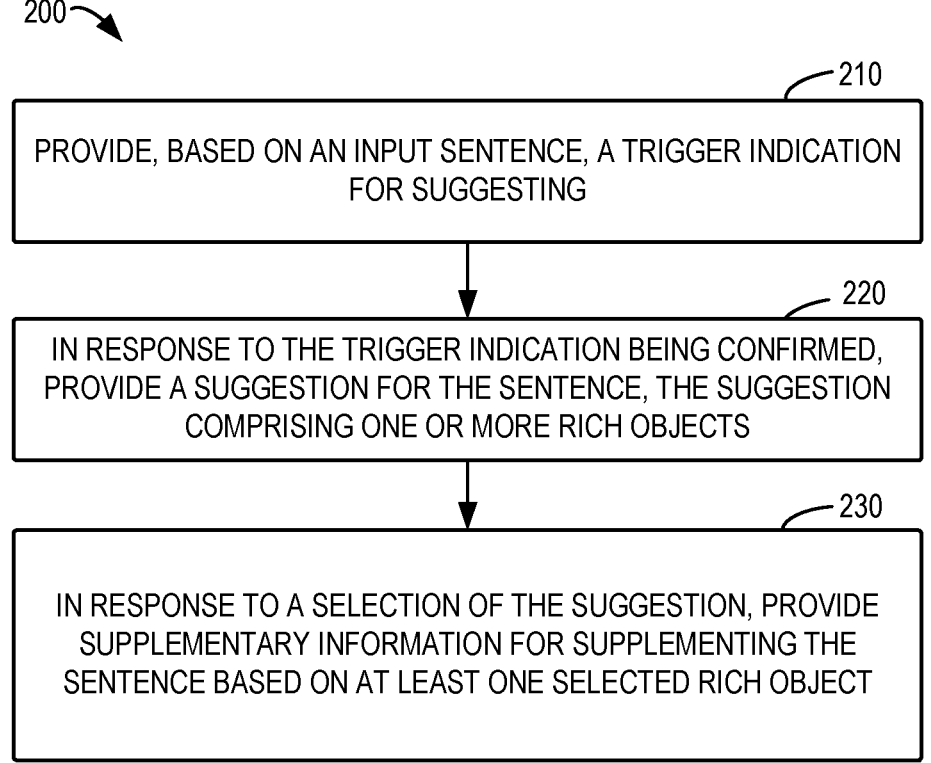

200

210

PROVIDE, BASED ON AN INPUT SENTENCE, A TRIGGER INDICATION
FOR SUGGESTING

220

IN RESPONSE TO THE TRIGGER INDICATION BEING CONFIRMED,
PROVIDE A SUGGESTION FOR THE SENTENCE, THE SUGGESTION
COMPRISING ONE OR MORE RICH OBJECTS

230

IN RESPONSE TO A SELECTION OF THE SUGGESTION, PROVIDE
SUPPLEMENTARY INFORMATION FOR SUPPLEMENTING THE
SENTENCE BASED ON AT LEAST ONE SELECTED RICH OBJECT

Major constitutes of the art include visual arts

500

600

160     610

We are in the Forbidden City  ?

190

AUTO-SUGGESTION WITH RICH OBJECTS

CLAIM OF PRIORITY

This application is a U.S. National Stage Filing under 35 U.S.C. 371 of International Patent Application Serial No. PCT/US2022/030463, filed May 23, 2022, and published as WO 2023/278069 A1 on Jan. 5, 2023, which claims the benefit of priority to Chinese Patent Application No. 202110739558.1J28, filed Jun. 30, 2021, which applications and publication are incorporated herein by reference in their entirety.

BACKGROUND

Auto-suggesting is used to automatically provide a suggestion associated with a user input. This can improve the efficiency of inputting contents and auto-complete the inputted contents, thereby enhancing user experience. For example, in the case of text input, auto-suggesting may provide a user with candidate words for selection when the user is typing, such that the manual typing of certain words can be avoided. However, conventional auto-suggestions are mainly in the form of text and information provided in the conventional auto-suggestions is not rich enough.

SUMMARY

According to implementations of the subject matter described herein, a solution is proposed for auto-suggesting. In this solution, a trigger indication for suggesting is provided based on an input sentence. In response to the trigger indication being confirmed, a suggestion for the sentence is provided, the suggestion comprising one or more rich objects. In response to a selection of the suggestion, supplementary information for supplementing the sentence is provided based on at least one selected rich object. In this way, various auto-suggestions comprising rich objects may be provided and thus rich supplementary information may be provided to supplement the input sentence to enhance the user experience.

This Summary is provided to introduce a selection of concepts in a simplified form and it will be further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 illustrates a flowchart of a method for auto-suggesting according to the implementations of the subject matter described herein;

Throughout the drawings, the same or similar reference signs refer to the same or similar elements.

DETAILED DESCRIPTION

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As described above, contents of auto suggestions provided by conventional auto-suggesting methods are not rich enough. For example, in the field of text input, conventional auto-suggesting methods only provide auto suggestions in the literal sense of words and fail to provide other types of suggestions.

According to the implementations of the subject matter described herein, a solution is proposed for auto-suggesting. In the solution, a trigger indication of suggesting is provided based on an input sentence. In response to the trigger indication being confirmed, a suggestion is provided for the sentence, the suggestion comprising one or more rich objects. In response to the suggestion being selected, supplementary information is provided based on the selected at least one rich object, so as to supplement the sentence. In this way, diverse auto suggestions that comprise rich objects may be provided, so that the input sentence can be supplemented using rich supplementary information so as to enhance the user experience. Detailed description is presented below to various example implementations of the solution in conjunction with the drawings.

Figure 1:
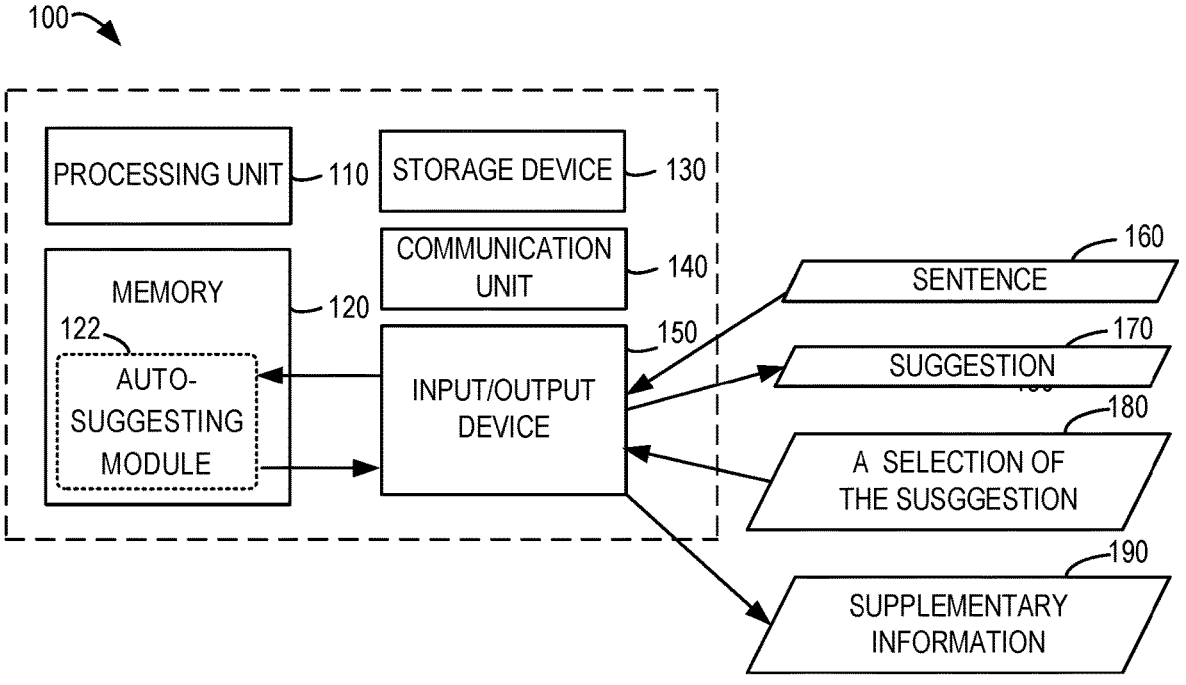
FIG. 1 illustrates a block diagram of a computing device which can implement a plurality of implementations of the subject matter described herein.

FIG. 1 illustrates a block diagram of a computing device 100 that can implement a plurality of implementations of the subject matter described herein. It should be understood that the computing device 100 shown in FIG. 1 is only exemplary and shall not constitute any limitation on the functions and scopes of the implementations described by the subject matter described herein. As shown in FIG. 1, the computing device 100 includes a computing device 100 in the form of a general purpose computing device. Components of the computing device 100 may include, but are not limited to, one or more processors or processing units 110, a memory 120, a storage device 130, one or more communication units 140, and one or more input/output devices 150.

In some implementations, the computing device 100 may be implemented as various user terminals or service terminals with computing capability. The service terminals may be servers, large-scale computing devices, and the like provided by a variety of service providers. The user terminal, for example, is a mobile terminal, a fixed terminal or a portable terminal of any type, including a mobile phone, a site, a unit, a device, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. It may also be predicted that the computing device 100 can support any type of user-specific interface (such as a "wearable" circuit, and the like).

The processing unit 110 may be a physical or virtual processor and may execute various processing based on the programs stored in the memory 120. In a multi-processor system, a plurality of processing units executes computer-executable instructions in parallel to enhance parallel processing capability of the computing device 100. The processing unit 110 can also be known as a central processing unit (CPU), microprocessor, controller and microcontroller.

The computing device 100 usually includes a plurality of computer storage mediums. Such mediums may be any attainable medium accessible by the computing device 100, including but not limited to, a volatile and non-volatile medium, a removable and non-removable medium. The memory 120 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof. The memory 120 may include an auto-suggesting module 122, which is configured to perform various functions described herein. The auto-suggesting module 122 may be accessed and operated by the processing unit 110 to realize corresponding functions.

The storage device 130 may be a removable or non-removable medium, and may include a machine-readable medium (e.g., a memory, a flash drive, a magnetic disk) or any other medium, which may be used for storing information and/or data and be accessed within the computing device 100. The computing device 100 may further include additional removable/non-removable, volatile/non-volatile storage mediums. Although not shown in FIG. 1, there may be provided a disk drive for reading from or writing into a removable and non-volatile disk and an optical disc drive for reading from or writing into a removable and non-volatile optical disc. In such cases, each drive may be connected to a bus (not shown) via one or more data medium interfaces.

The communication unit 140 implements communication with another computing device via a communication medium. Additionally, functions of components of the computing device 100 may be realized by a single computing cluster or a plurality of computing machines, and these computing machines may communicate through communication connections. Therefore, the computing device 100 may operate in a networked environment using a logic connection to one or more other servers, a Personal Computer (PC) or a further general network node.

The input/output device 150 may be one or more various input devices, such as a mouse, a keyboard, a trackball, a voice-input device, and the like. The input/output device 150 may be one or more output devices, e.g., a display, a loudspeaker, a printer, and so on. The computing device 100 may also communicate through the communication unit 140 with one or more external devices (not shown) as required, where the external device, e.g., a storage device, a display device, and so on, communicates with one or more devices that enable users to interact with the computing device 100, or with any device (such as a network card, a modem, and the like) that enable the computing device 100 to communicate with one or more other computing devices. Such communication may be executed via an Input/Output (I/O) interface (not shown).

In some implementations, apart from being integrated on an individual device, some or all of the respective components of the computing device 100 may also be set in the form of a cloud computing architecture. In the cloud computing architecture, these components may be remotely arranged and may cooperate to implement the functions described by the subject matter described herein. In some implementations, the cloud computing provides computation, software, data access and storage services without informing a terminal user of physical locations or configurations of systems or hardware providing such services. In various implementations, the cloud computing provides services via a Wide Area Network (such as Internet) using a suitable protocol. For example, the cloud computing provider provides, via the Wide Area Network, the applications, which can be accessed through a web browser or any other computing component. Software or components of the cloud computing architecture and corresponding data may be stored on a server at a remote location. The computing resources in the cloud computing environment may be merged or spread at a remote datacenter. The cloud computing infrastructure may provide, via a shared datacenter, the services even though they are shown as a single access point for the user. Therefore, components and functions described herein can be provided using the cloud computing architecture from a service provider at a remote location. Alternatively, components and functions may also be provided from a conventional server, or they may be mounted on a client device directly or in other ways.

The computing device 100 may be used for auto-suggesting according to various implementations of the subject matter described herein. As shown in FIG. 1, the computing device 100 may receive, via the input/output device 150, a sentence 160 input from a user. The sentence 160 may be in the form of audio or text. The sentence 160 which is in the form of audio may be converted into the sentence 160 which is in the form of text so as to be analyzed later. The sentence 160 may be a complete sentence that conforms to natural language rules. The sentence 160 may also be an incomplete sentence. For example, the sentence 160 may be a complete sentence like "Major constitutes of the art include visual arts and performing arts." Also, the sentence 160 may be an incomplete sentence like "Major constitutes of the art include". The input/output device 150 may transmit the sentence 160 to the auto-suggesting module 122. The auto-suggesting module 122 determines a suggestion 170 to be provided to the user based on the sentence 160. The suggestion 170 may be provided to the user in the form of auditory or visual information. The suggestion 170 comprises one or more rich objects. Examples of the one or more rich objects may comprise text information, image information, audio information, hyperlinks, etc. In other words, the suggestion 170 may comprise multiple content items provided in the form of audio, text, image, or hyperlink. The input/output device 150 may receive a selection 180 of the suggestion 170. The user may select one or more content items of the suggestion 170 via a user interface. The input/output device 150 may transmit the selection 180 of the suggestion to the auto-suggesting module 122. The auto-suggesting module 122 may determine supplementary information 190 for supplementing the sentence 160 based on at least one selected rich object. The supplementary information 190 may be diverse information provided in the form of audio, text, image or hyperlink.

FIG. 2 illustrates a flowchart of a method 200 for auto-suggesting according to some implementations of the subject matter described herein. The method 200 may be implemented by the computing device 100 of FIG. 1. For example, the method 200 may be implemented at the auto-suggesting module 122 in the memory 120 of the computing device 100.

As shown in FIG. 2, at block 210, the computing device 100 provides a trigger indication for suggesting based on the input sentence 160. The trigger indication may be at least one mark. The suggestion 170 may be of a type amongst a plurality of types of suggestions, and the type of the mark depends on the type of the suggestion 170. In other words, the computing device 100 may display a mark specific to the type of the suggestion 170 as the trigger indication. For example, for the suggestion 170 with the type of reference information, the trigger indication may be represented as a mark "?" or "R". Alternatively or additionally, for the suggestion 170 with the type of continuation, the trigger indication may be represented as a mark "↓".

In some implementations, the computing device 100 may determine whether it is feasible to provide the suggestion 170 and provide the trigger indication for suggesting when the determined feasibility exceeds a threshold. The computing device 100 may perform a real-time analysis on the input sentence 160 to dynamically determine the feasibility of providing the suggestion 170. In other words, the computing device 100 may monitor the sentence 160 being currently input and determine whether to provide the suggestion 170. In some implementations, in response to an instruction of the user, the computing device 100 may start analyzing the input sentence 160 to determine the feasibility of providing the suggestion 170. For example, after completion of inputting a whole paragraph, the user may send an instruction to the computing device 100 to determine the feasibility of providing the suggestion 170. With the trigger indication being provided when it is feasible to provide the suggestion 170, computing resources may be saved and user experience may be improved because the user may be avoided from being provided with inaccurate suggestions.

In some implementations, the computing device 100 may determine the feasibility by predicting a probability that the next word input for the sentence 160 is an entity. Here, the entity refers to a uniquely identified object with rich information. Examples of the object may comprise an article, an Internet post, a person, an event, a city, etc. In other words, the computing device 100 may predict, based on the current sentence 160, the probability that the next word to be input by the user is an entity. If the probability exceeds a threshold, the computing device 100 may determine that it is feasible to provide the suggestion 170 to the user. Otherwise, the computing device 100 may determine that it is unfeasible to provide the suggestion 170 to the user. Various methods may be used to predict the probability. For example, a predictor may be used to predict the probability that the next word to be input is an entity. The predictor may be trained with a training dataset comprising a plurality of training sentences. In the training dataset, the last word in the training sentence is labeled to indicate whether a subsequent word for the training sentence is an entity. The scope of the subject matter described herein is not limited in the regard of building and training the predictor.

In some implementations, the computing device 100 may determine the feasibility by determining similarities between at least one word in the sentence 160 and entities in a database. The database may be an internal database stored in the memory 120. The database may also be a database that is external to the memory 120 and communicates with the computing device 100. The database may be any appropriate database that comprises entities. Examples of the database may comprise a relational database and a graph database. In particular, the database may be a knowledge graph that stores entities as nodes and associated relations between the entities. Alternatively, the database may have an index for querying such that the user may query the database based on a query statement.

In some implementations, the database with an index may be built. Specifically, a plurality of sentences may be extracted from encyclopedias (such as Wikipedia) wherein each sentence may comprise chunks connected with coordinating conjunctions such as "and", "or", "as well as" and each chunk is associated with a respective entity. Based on the plurality of extracted sentences, the database with the index may be built by using a search engine building tool such as Lucene.Net.

In some implementations, the computing device 100 may use various methods to determine the similarities between the at least one word in the sentence 160 and entities in the database. The computing device 100 may determine the similarities by matching words in the sentence 160 to the entities in the database. The similarity between a word and an entity may be determined by using text matching methods such as keyword matching. For example, based on the literal matching between the word "art" in the sentence 160 "Major constitutes of the art include" and the name "art" of an entity in the database, the similarity between the word "art" in the sentence 160 and the entity "art" in the database may be determined to be high. Alternatively or in addition, the similarity between a word in the sentence 160 and an entity may be determined by using a semantic matching method. For example, based on the semantic matching between the word "cars" in the sentence 160 "Major constitutes of cars include" and the name "sedan" of an entity in the database, the similarity between the word "cars" in the sentence 160 and the entity "sedan" in the database may be determined to be high.

Alternatively or additionally, the computing device 100 may determine the similarity between the word in the sentence 160 and the entity in the database by identifying an entity corresponding to the word in the sentence 160 and comparing the identified entity with the entity in the database. The similarity between entities may be characterized by the similarity between embeddings of the entities. The scope of the subject matter described herein is not limited in the regard of methods for determining the similarity between a word in the sentence 160 and an entity in the database. In some implementations, the computing device 100 may determine, for each word in the sentence 160, the similarities between the respective word and the entities in the database and calculate the similarities between the sentence 160 and the entities by considering the respective similarities comprehensively. Based on the similarities between the sentence 160 and the entities in the database, the computing device 100 may determine whether it is feasible to provide the suggestion 170 to the user.

In some implementations, the computing device 100 may determine the similarities between a predetermined number of words in the sentence 160 and the entities in the database. If the similarities between the predetermined number of words and the corresponding entities exceed a threshold, the computing device 100 may determine that it is feasible to provide the suggestion 170 to the user. The predetermined number may be one.

In some implementations, the database used for comparison with the sentence 160 may be a specified part of a database. For example, the user may specify that only information related to arts in the database is selected for determining the similarities between the at least one word in the sentence 160 and the entities in the database.

It should be understood that when determining the feasibility of providing the suggestion 170 to the user, the computing device 100 may have not determined the specific contents included in the suggestion 170. As another example, the computing device 100 may also determine whether to provide the suggestion 170 to the user after determining the specific contents included in the suggestion 170. In other words, the computing device 100 may determine the suggestion 170 after providing the trigger indication of the suggestion 170. Alternatively, the computing device 100 may determine the suggestion 170 before providing the trigger indication of the suggestion 170. At block 220, the computing device 100 provides the suggestion 170 for the sentence 160 in response to the trigger indication being confirmed. As described above, the suggestion 170 comprises one or more rich objects. The trigger indication may be confirmed by a click on the trigger indication or other similar operations performed via a user interface. Providing the suggestion 170 may comprise displaying the suggestion 170 at the sentence 160. Alternatively or additionally, providing the suggestion 170 may comprise displaying the suggestion 170 at a specific location in the user interface. With the suggestion 170 being provided in response to the trigger indication being confirmed, the user may be avoided from being provided the suggestion 170 too frequently, thereby improving the user experience.

In some implementations, the computing device 100 may determine the suggestion 170 based on literal information of the sentence 160. Alternatively or additionally, the computing device 100 may determine the suggestion 170 based on semantic information of the sentence 160. The semantic information may comprise semantics of words in the sentence 160 and contextual information of the sentence 160. Alternatively or additionally, the computing device 100 may determine the suggestion 170 based on user preference.

In some implementations, based on the literal information of the sentence 160, one or more entities associated with the sentence 160 in the database may be identified. For example, the entity associated with the sentence 160 may be identified by text matching methods such as keyword matching and the like. Alternatively or additionally, the entity associated with the sentence 160 in the database may be identified based on the semantic information of the sentence 160. The semantic information comprises the semantics of words and the contextual information. For example, the entity associated with the sentence 160 may be identified by the semantic matching between the word in the sentence 160 and the entity.

In some implementations, the entity associated with the sentence 160 in the database may be determined by an entity linking algorithm and thus the suggestion 170 may be determined. Specifically, an entity mention may be identified in the sentence 160. At least one of the entities in the database that matches the entity mention may be identified. Then the suggestion 170 may be determined based on the at least one identified entity. The entity linking algorithm may use the contextual information and the semantics of words in the sentence 160 to perform entity recognition and entity disambiguation. The entity disambiguation may link the entity mention in the sentence 160 to an entity which is uniquely identified in the database. The scope of the subject matter described herein is not limited in the regard of entity linking algorithms.

In some implementations, the associated entity may be identified by using a query statement corresponding to the sentence 160 to search the database. The query statement corresponding to the sentence 160 may be determined by using various methods. For example, the sentence 160 may be converted into a database query statement by identifying entities in the sentence 160 and extracting relationships between the entities. With the query statement being used to search the database, at least one entity associated with the sentence 160 may be found in the database. The suggestion 170 may be determined based on the at least one entity.

In some implementations, the sentence 160 may be used directly as a query statement to query the database with an index for querying. Based on a result of the querying, at least one of the entities in the database may be identified. For example, with respect to a database built as described above, based on the sentence 160, a sentence similar to the sentence 160 in the database may be determined as the result of the querying. The result may be determined based on the text similarities between the sentence 160 and sentences in the database. The result may also be determined based on context of the sentence 160. The suggestion 170 may be determined based on the at least one entity in the result.

In some implementations, the entity associated with the sentence 160 may be generated directly based on the sentence 160. For example, an entity generating model may be used to generate one or more entities based on the sentence 160 and one or more associated entities corresponding to the one or more generated entities may be identified in the database. The suggestion 170 may be determined based on the one or more associated entities. The scope of the subject matter described herein is not limited in the regard of entity generating models.

Additionally, the entity associated with the sentence 160 in the database may be identified based on user preference. For example, the entity associated with the sentence 160 may be identified from a specified portion of the database based on historical data or user instructions.

In this way, based on the entity associated with the sentence 160 in the database which is disambiguated, the suggestion 170 may be determined with a higher accuracy.

In some implementations, the computing device 100 may determine the suggestion 170 based on information of the one or more determined entities. In some implementations, the suggestion 170 may comprise a plurality of pieces of information of one entity. For example, the suggestion 170 may comprise information about various properties of the entity. In some implementations, the suggestion 170 may comprise a plurality of pieces of information of multiple entities. The suggestion 170 may comprise information of an entity recommended based on the sentence 160. For example, the suggestion 170 for the example sentence 160 "Major constitutes of the art include" may comprise information of entities "visual arts" and "performing arts", e.g., entity names of these entities. The suggestion 170 may also comprise information of entities included in the sentence 160. For example, the suggestion 170 for the example sentence 160 "Major constitutes of the art include" may comprise a brief description and/or a video link of the entity "art" stored in the database. The suggestion 170 may also comprise information of entities that match words in the sentence 160. For example, the suggestion 170 for the example sentence 160 "Major constitutes of cars include" may comprise a brief description and/or a video link of the entity "sedan" stored in the database.

At block 230, in response to the selection 180 of the suggestion 170, the computing device 100 provides, based on the selected at least one rich object, supplementary information 190 to supplement the sentence 160. The selection 180 of the suggestion 170 may be performed via a user interface. For example, the selection 180 may be performed by clicking on one or more content items in the suggestion 170. As another example, the selection 180 of the suggestion 170 may be performed by confirming the suggestion 170. As described above, the suggestion 170 may comprise one or more rich objects. In other words, the suggestion 170 may comprise a plurality of pieces of information of one or more entities and the plurality of pieces of information may be in diverse forms. The auto-suggesting module 122 may receive the selection 180 of the suggestion 170. In some embodiments, information of one entity in the suggestion 170 may be selected as the supplementary information 190 to supplement the sentence 160. Alternatively, information of multiple entities in the suggestion 170 may be selected as the supplementary information 190 to supplement the sentence 160. Examples of information of the entities may comprise names and property values of entities, etc. The supplementary information 190 may comprise at least one of text information, image information, audio information or hyperlinks.

In some implementations, the supplementary information 190 may be determined based on the content item(s) selected from the suggestion 170. For example, a service may be called based on an entity corresponding to the selected content item. Different services may be called depending on types of the entities. For example, if a content item of an entity related to geography is selected from the suggestion 170, the computing device 100 may call a map service and determine a map associated with the entity as the supplementary information 190.

In some implementations, reference information of the supplementary information 190 may be provided. The reference information may indicate the source of the entity used for determining the supplementary information 190. Alternatively or in addition, the reference information may indicate the source of information used for determining the supplementary information 190. For example, the reference information may comprise an annotation of the queried database (such as Wikipedia). In another example, the reference information may comprise an annotation of the called service (such as Google Maps). Similarly, the computing device 100 may provide a trigger indication for the reference information. The suggestion 170 may comprise a plurality of types of reference information. The reference information may be used as additional supplementary information to supplement the sentence 160. For example, the reference information related to the source of the supplementary information 190 may be displayed near the supplementary information 190. In this way, with the reference information being introduced, the credibility of the supplementary information 190 may be increased, thereby improving the user experience.

In some implementations, the supplementary information 190 may be used to continue the sentence 160. In other words, information of the entity selected from the at least one entities in the suggestion 170 may be used to continue the sentence 160. Details of continuing the sentence 160 based on the selected entity may be described with reference to FIG. 3 below.

Figure 3:
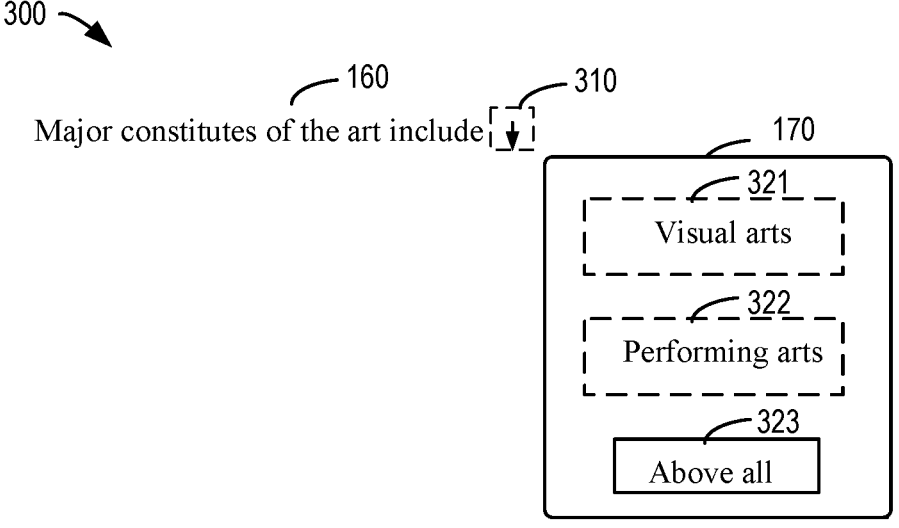
FIG. 3 illustrates a schematic view of the process of entity recommendation according to the implementations of the subject matter described herein.

FIG. 3 shows a schematic view of the process 300 of entity recommendation according to the implementations of the subject matter described herein. FIG. 3 shows the sentence 160 being input currently, a mark 310 representing the trigger indication, and the suggestion 170. The suggestion 170 may be displayed in response to the user clicking on the mark 310. As shown in FIG. 3, content items 321 and 322 in the suggestion 170 may comprise information of recommended entities "visual arts" and "performing arts" respectively. Herein names of the entities are presented as the information of the entities. Alternatively or in addition, some or all of the information of the recommended entities stored in the database may be provided in the form of hyperlinks.

The suggestion 170 may further comprise an "above all" icon 323 that indicates all of the recommended entities are accepted. The user may select one or more of the recommended entities via the user interface. The user may also directly click on the "above all" icon 323 to select all of the recommended entities. Information of the selected entity may be used as the supplementary information 190 to continue the sentence 160. Information of the entity may comprise text information of the entity. The text information of the entity may be used to continue the sentence 160. For example, if the user selects the entity "visual arts", then the computing device 100 may use the text information of the entity "visual arts", i.e., the name "visual arts" to continue the sentence 160. The continued sentence is "Major constitutes of the art include visual arts." As another example, if the user clicks on the "above all" icon 323, then the continued sentence is "Major constitutes of the art include visual arts and performing arts."

In some implementations, the computing device 100 may provide a new suggestion based on the supplemented sentence. For example, a new trigger indication may be provided based on the supplemented sentence. In response to the new trigger indication being confirmed, a new suggestion for the supplemented sentence may be provided. As described above, whether to provide a suggestion and determine content items to be included in the suggestion may be determined dynamically. In other words, whether to trigger and provide a new suggestion may be determined dynamically based on the supplemented sentence and a further user input. The computing device 100 may adjust the order of the content items in the suggestion 170 based on the similarities between the selected entity and entities corresponding to the content items. For example, the similarity between entities may be determined based on embeddings of the entities in the graph database. Based on the determined similarities, the order of content items in the suggestion 170 may be updated to generate the new suggestion. Alternatively or in addition, a part of the content items may be discarded to generate the new suggestion. Alternatively or in addition, a new entity may be identified based on the supplemented sentence, such that a new content item may be generated in the new suggestion. Details of providing a new suggestion based on the supplemented sentence will be described with reference to FIG. 4 below.

Figure 4:
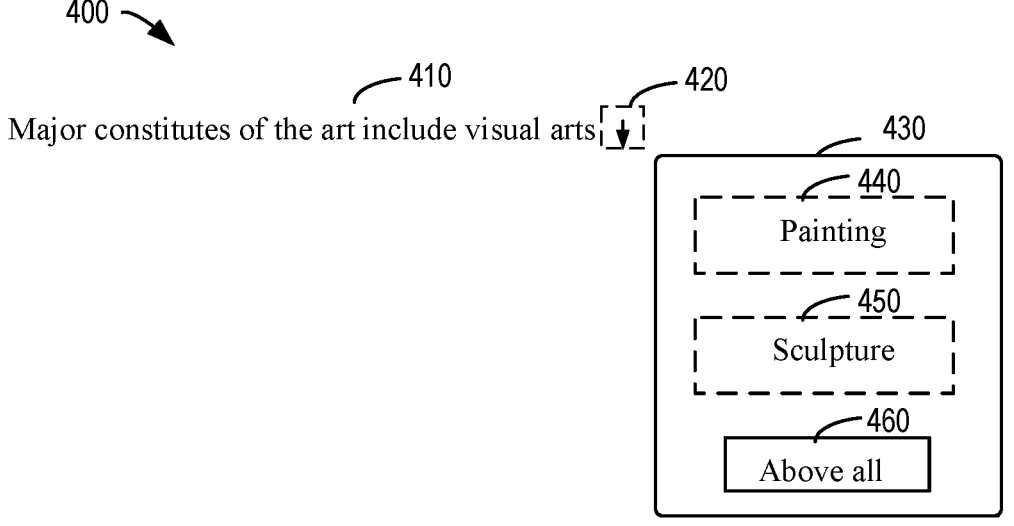
FIG. 4 illustrates a schematic view of the process of providing a new suggestion according to the implementations of the subject matter described herein.

FIG. 4 shows a schematic view of the process 400 of providing a new suggestion according to the implementations of the subject matter described herein. FIG. 4 shows a supplemented sentence 410, a mark 420 representing a new trigger indication, and a new suggestion 430. As shown in FIG. 4, with respect to the example sentence 160 "Major constitutes of the art include," if the user selects the literal information of the entity "visual arts" in the suggestion 170 as the supplementary information 190 to supplement the sentence 160, then the computing device 100 may provide the new suggestion 430 based on the supplemented sentence 410 "Major constitutes of the art include visual arts." For example, based on the entities "painting" and "sculpture" being associated with the entity "visual arts", the computing device 100 may determine the literal information of the entity "painting" and the entity "sculpture" as a content item 440 and a content item 450 in the new suggestion 430, respectively. The new suggestion 430 may also comprise an "above all" icon 460 indicating that the content item 440 and the content item 450 will both be selected.

Alternatively or additionally, the supplementary information 190 may be used to provide reference information associated with the sentence 160. For example, the reference information associated with the sentence 160 may be provided using annotations of the selected entity in the suggestion 170. Annotations of the entity may comprise the name of the entity, property values of the entity, etc. Details of supplementing the sentence 160 by using entity annotations will be described with reference to FIG. 5 below.

Figure 5:
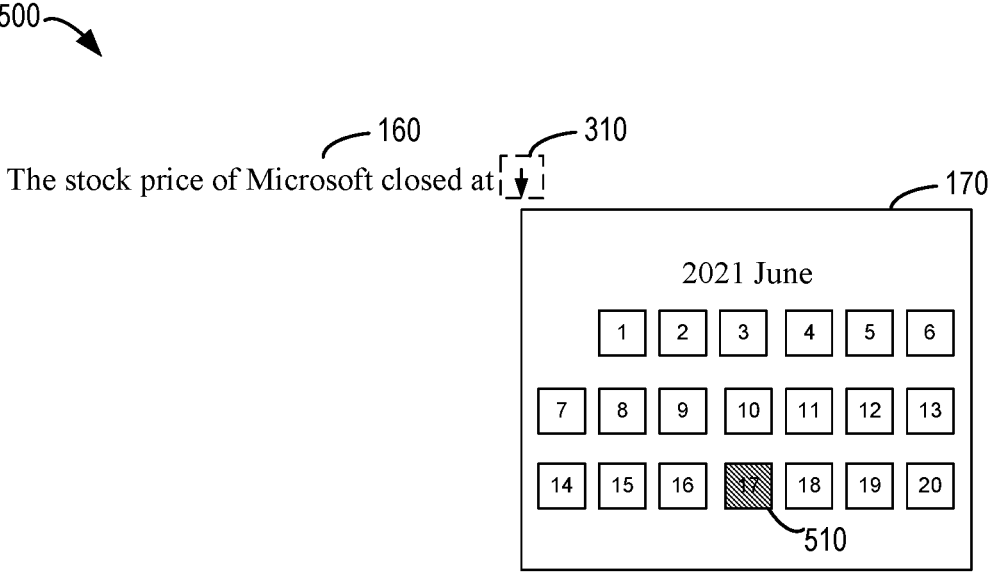
FIG. 5 illustrates a schematic view of the process of entity annotation according to the implementations of the subject matter described herein.

FIG. 5 shows a schematic view of the process 500 of entity annotation according to the implementations of the subject matter described herein. FIG. 5 shows a sentence 160 being currently input by the user, the mark 310 representing the trigger indication and the suggestion 170. The suggestion 170 may be displayed in response to the user clicking on the mark 310. As shown in FIG. 5, the suggestion 170 may comprise multiple values of the property "stock price" of the entity "Microsoft." The suggestion 170 is shown in the form of a calendar. Each icon indicating a date is associated with the stock price of Microsoft closed on that date. If the user selects an icon 510 indicating the date Jun. 17, 2021, then the computing device 100 may extracts from the database the stock price 260.9 of Microsoft closed on Jun. 17, 2021 as the supplementary information 190 to supplement the sentence 160. The supplemented sentence reads that "The stock price of Microsoft closed at 260.9 on Jun. 17, 2021."

In some implementations, the computing device 100 may supplement the sentence 160 by expanding information of the selected entity in the suggestion 170. For example, the supplementary information 190 may be generated by calling a service associated with the selected entity. The associated service to be called may be determined based on the type of the selected entity. In other words, respective services corresponding to the types of the entities may be called to provide richer supplementary information. For example, if the entity is related to a geographical position, the computing device 100 may call a map service or a navigation service. As another example, if the entity is related to music, then a music player service may be called. Additionally or alternatively, the associated service to be called may be determined based on user selection or historical data. Details of supplementing the sentence 160 by using entity expansion will be described with reference to FIG. 6 below.

Figure 6:
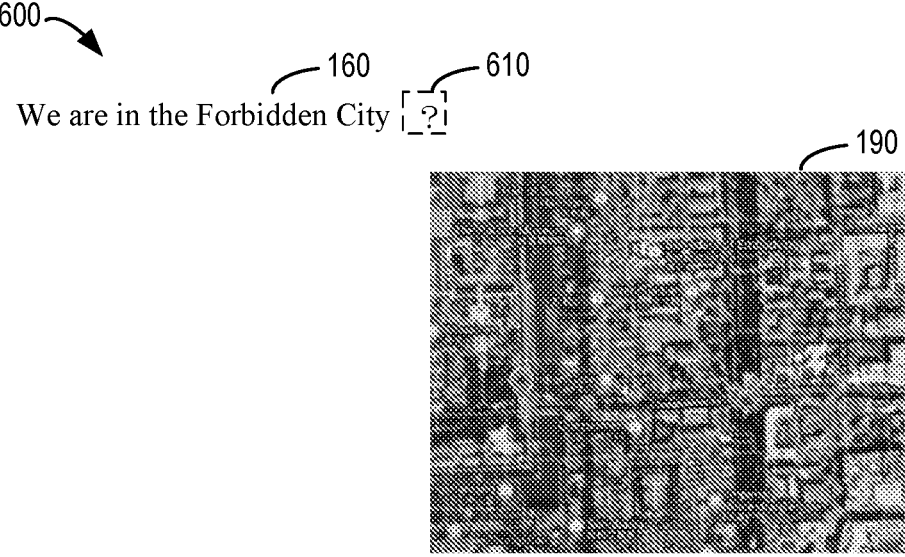
FIG. 6 illustrates a schematic view of the process of entity expansion according to the implementations of the subject matter described herein.

FIG. 6 shows a schematic view of the process 600 of entity expansion according to the implementations of the subject matter described herein. FIG. 6 shows the sentence 160 being currently input by the user, a mark 610 representing the trigger indication and supplementary information 190. Unlike the mark 310 shown in FIGS. 3 and 5, the mark 610 may take the form of "?." The user may trigger the display of the suggestion 170 (not shown) by clicking on the mark 610. The suggestion 170 may comprise multiple pieces of information of the entity "the Forbidden City." For example, the suggestion 170 may comprise the geographical position, navigation information, brief introduction, video links of the Forbidden City, etc. As shown in FIG. 6, if the user selects the geographical position of the Forbidden City in the suggestion 170, then the computing device 100 may call a map service to display a map indicating the geographical position of the Forbidden City as the supplementary information 190 for supplementing the sentence 160. Alternatively or additionally, a navigation service may be called to display navigation information (e.g., bus information, subway information, driving route, etc.) related to the geographical position of the Forbidden City as the supplementary information 190 for supplementing the sentence 160. As can be seen from the foregoing description, the auto-suggesting solution according to the implementations of the subject matter described herein can use rich information of entities in the database to provide diverse auto-suggestions, thereby increasing the effectiveness of supplementing the sentence being input by the user and enhancing the user experience. It should be understood that the implementations of the subject matter described herein are applicable to any appropriate text input environment, e.g., an embedded environment in a text editor. With rich entity-based information being provided as suggestions when the user is inputting contents, additional search may be avoided and thus the user experience may be improved.

Some example implementations of the subject matter described herein are listed below. In one aspect, the subject matter described herein provides a computer-implemented method. The method comprises: providing a trigger indication for suggesting based on an input sentence. In response to the trigger indication being confirmed, a suggestion for the sentence is provided, the suggestion comprising one or more rich objects. In response to a selection of the suggestion, supplementary information for supplementing the sentence is provided based on at least one selected rich object.

In some implementations, supplementing the sentence comprises at least one of: continuing the sentence, providing reference information associated with the sentence, or calling a service associated with the sentence.

In some implementations, the one or more rich objects comprise at least one of text information, image information, audio information or hyperlinks.

In some implementations, the method further comprises: providing a new trigger indication based on the supplemented sentence; in response to the new trigger indication being confirmed, providing a new suggestion for the supplemented sentence.

In some implementations, providing the suggestion for the sentence comprises determining the suggestion based on at least one of: literal information of the sentence, semantic information of the sentence, or user preference.

In some implementations, providing the suggestion for the sentence comprises: querying a database based on the sentence, the database having an index for querying; identifying, based on a result of the querying, at least one of a plurality of entities in the database, each of the plurality of entities being uniquely identified; and determining the suggestion based on the at least one identified entity.

In some implementations, providing the suggestion for the sentence comprises: recognizing an entity mention in the sentence; identifying, from a plurality of entities in a database, at least one entity that matches the entity mention, each of the plurality of entities being uniquely identified; and determining the suggestion based on the at least one identified entity.

In some implementations, providing the suggestion for the sentence comprises: determining a query statement corresponding to the sentence by at least identifying an entity in the sentence; querying, based on the query statement, a database comprising a plurality of entities, each of the plurality of entities being uniquely identified; and determining the suggestion based on at least one entity queried from the database.

In some implementations, providing the trigger indication for suggesting comprises at least one of: predicting a probability that the next word to be input for the sentence is an entity, or determining similarities between at least one word in the sentence and entities in a database. In another aspect, the subject matter described herein provides an electronic device. The electronic device comprises: a processing unit; and a memory coupled to the processing unit and comprising instructions stored thereon which, when executed by the processing unit, cause the device to perform acts comprising: providing a trigger indication for suggesting based on an input sentence. In response to the trigger indication being confirmed, a suggestion for the sentence is provided, the suggestion comprising one or more rich objects. In response to a selection of the suggestion, supplementary information for supplementing the sentence is provided based on at least one selected rich object.

In some implementations, supplementing the sentence comprises at least one of: continuing the sentence, providing reference information associated with the sentence, or calling a service associated with the sentence.

In some implementations, the one or more rich objects comprise at least one of text information, image information, audio information or hyperlinks.

In some implementations, the acts further comprise: providing a new trigger indication based on the supplemented sentence; in response to the new trigger indication being confirmed, providing a new suggestion for the supplemented sentence.

In some implementations, providing the suggestion for the sentence comprises determining the suggestion based on at least one of: literal information of the sentence, semantic information of the sentence, or user preference.

In some implementations, providing the suggestion for the sentence comprises: querying a database based on the sentence, the database having an index for querying; identifying, based on a result of the querying, at least one of a plurality of entities in the database, each of the plurality of entities being uniquely identified; and determining the suggestion based on the at least one identified entity.

In some implementations, providing the suggestion for the sentence comprises: recognizing an entity mention in the sentence; identifying, from a plurality of entities in a database, at least one entity that matches the entity mention, each of the plurality of entities being uniquely identified; and determining the suggestion based on the at least one identified entity.

In some implementations, providing the suggestion for the sentence comprises: determining a query statement corresponding to the sentence by at least identifying an entity in the sentence; querying, based on the query statement, a database comprising a plurality of entities, each of the plurality of entities being uniquely identified; and determining the suggestion based on at least one entity queried from the database.

In some implementations, providing the trigger indication for suggesting comprises at least one of: predicting a probability that the next word to be input for the sentence is an entity, or determining similarities between at least one word in the sentence and entities in a database. In a further aspect, the subject matter described herein provides a computer program product being tangibly stored in a non-transitory computer storage medium and comprising machine-executable instructions which, when executed by a device, causing the device to perform the method of the above aspect.

In a further aspect, the subject matter described herein provides a computer program product including machine-executable instructions which, when executed by a device, cause the device to perform the method of the above aspect.

In a further aspect, the subject matter described herein provides a computer-readable medium having machine-executable instructions stored thereon which, when executed by a device, cause the device to perform the method of the above aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:

performing, by a computing device, real-time monitoring of an input sentence being entered via a user interface;

using a trained machine learning predictor to predict a probability that a next word to be input for the sentence is an entity, the predictor trained with a training dataset comprising training sentences labeled to indicate whether a subsequent word is an entity;

determining whether the predicted probability exceeds a threshold;

based on the predicted probability exceeding the threshold:

determining that providing, via the user interface, a trigger indication for a suggestion is feasible based on the input sentence, the suggestion having a type; and displaying the trigger indication as a mark at a location in the user interface associated with the input sentence, the mark having a type, wherein the trigger mark type is based on the suggestion type;

in response to the trigger indication being feasible, querying, based on the sentence, a database generated with a search engine tool and having an index for querying, the database comprising a knowledge graph storing a plurality of entities as nodes and associated relations between the entities as edges, each of the plurality of entities being uniquely identified;

identifying, based on a result of the querying using an entity linking algorithm that performs entity disambiguation, at least one of the plurality of entities in the database that matches an entity mentioned in the sentence;

determining, using embeddings of the identified at least one entity in the knowledge graph, a sentence suggestion for the sentence, the sentence suggestion comprising one or more rich objects having information of the at least one identified entity;

displaying the sentence suggestion via the user interface; and in response to a selection of the sentence suggestion, providing supplementary information for supplementing the sentence based on at least one selected rich object.

2. The method of claim 1, wherein supplementing the sentence comprises at least one of:

continuing the sentence, providing reference information associated with the sentence, or calling a service associated with the sentence.

3. The method of claim 1, wherein the one or more rich objects comprise at least one of text information, image information, audio information or hyperlinks.

4. The method of claim 1, further comprising:

providing a new trigger indication based on the supplemented sentence; and in response to the new trigger indication being confirmed, providing a new suggestion for the supplemented sentence.

5. The method of claim 1, wherein providing the sentence suggestion comprises determining the suggestion based on at least one of:

literal information of the sentence, semantic information of the sentence, or user preference.

6. The method of claim 1, wherein providing the sentence suggestion comprises:

querying, based on the sentence, a database with an index for querying;

identifying, based on a result of the querying, at least one of a plurality of entities in the database, each of the plurality of entities being uniquely identified; and determining the sentence suggestion based on the at least one identified entity.

7. The method of claim 1, wherein providing the sentence suggestion comprises:

recognizing an entity mention in the sentence;

identifying, from a plurality of entities in a database, at least one entity that matches the entity mention, each of the plurality of entities being uniquely identified; and determining the sentence suggestion based on the at least one identified entity.

8. The method of claim 1, wherein providing the sentence suggestion comprises:

determining a query statement corresponding to the sentence by at least identifying an entity in the sentence;

querying, based on the query statement, a database comprising a plurality of entities, each of the plurality of entities being uniquely identified; and determining the sentence suggestion based on at least one entity queried from the database.

9. The method of claim 1, wherein providing the trigger indication for suggesting comprises at least one of:

predicting a probability that the next word to be input for the sentence is an entity, or determining similarities between at least one word in the sentence and entities in a database.

10. An electronic device, comprising:

a processing unit; and a memory coupled to the processing unit and comprising instructions stored thereon which, when executed by the processing unit, cause the device to perform acts comprising:

performing real-time monitoring of an input sentence being entered via a user interface;

using a trained machine learning predictor to predict a probability that a next word to be input for the sentence is an entity, the predictor trained with a training dataset comprising training sentences labeled to indicate whether a subsequent word is an entity;

determining whether the predicted probability exceeds a threshold;

based on the predicted probability exceeding the threshold:

determining that providing, via the user interface and based on an input sentence, a trigger indication for a suggestion is feasible based on the input sentence, the suggestion having a type; and displaying the trigger indication as a mark at a location in the user interface associated with the input sentence, the mark having a type, wherein the trigger mark type is based on the suggestion type;

in response to the trigger indication being feasible, querying, based on the sentence, a database generated with a search engine tool and having an index for querying, the database comprising a knowledge graph storing a plurality of entities as nodes and associated relations between the entities as edges, each of the plurality of entities being uniquely identified;

identifying, based on a result of the querying using an entity linking algorithm that performs entity disambiguation, at least one of the plurality of entities in the database that matches an entity mentioned in the sentence;

determining, using embeddings of the identified at least one entity in the knowledge graph, a sentence suggestion for the sentence, the sentence suggestion comprising one or more rich objects having information of the at least one identified entity;

displaying the sentence suggestion via the user interface; and in response to a selection of the sentence suggestion, providing supplementary information for supplementing the sentence based on at least one selected rich object.

11. The device of claim 10, wherein supplementing the sentence comprises at least one of:

continuing the sentence;

providing reference information associated with the sentence; or calling a service associated with the sentence.

12. The device of claim 10, wherein providing the sentence comprises:

querying, based on the sentence, a database with an index for querying;

identifying, based on a result of the querying, at least one of a plurality of entities in the database, each of the plurality of entities being uniquely identified; and determining the sentence suggestion based on the at least one identified entity.

13. The device of claim 10, wherein providing the sentence suggestion comprises:

recognizing an entity mention in the sentence;

identifying, from a plurality of entities in a database, at least one entity that matches the entity mention, each of the plurality of entities being uniquely identified; and determining the sentence suggestion based on the at least one identified entity.

14. The device of claim 10, wherein providing the sentence suggestion comprises:

determining a query statement corresponding to the sentence by at least identifying an entity in the sentence;

querying, based on the query statement, a database comprising a plurality of entities, each of the plurality of entities being uniquely identified; and determining the sentence suggestion based on at least one entity queried from the database.

15. A computer program product, comprising machine-executable instructions stored in a non-transitory computer storage medium which, when executed by a device having a processor, cause the processor to perform operations comprising:

performing real-time monitoring of an input sentence being entered via a user interface;

using a trained machine learning predictor to predict a probability that a next word to be input for the sentence is an entity, the predictor trained with a training dataset comprising training sentences labeled to indicated whether a subsequent word is an entity;

determining whether the predicted probability exceeds a threshold;

based on the predicted probability exceeding the threshold:

determining that providing, via the user interface and based on an input sentence, a trigger indication for a suggestion is feasible based on the input sentence, the suggestion having a type; and displaying the trigger indication as a mark at a location in the user interface associated with the input sentence, the mark having a type, wherein the trigger mark type is based on the suggestion type;

in response to the trigger indication being feasible, querying, based on the sentence, a database generated with a search engine tool and having an index for querying, the database comprising a knowledge graph storing a plurality of entities as nodes and associated relations between the entities as edges, each of the plurality of entities being uniquely identified;

identifying, based on a result of the querying using an entity linking algorithm that performs entity disambiguation, at least one of the plurality of entities in the database that matches an entity mentioned in the sentence;

determining, using embeddings of the identified at least one entity in the knowledge graph, a sentence suggestion for the sentence, the sentence suggestion comprising one or more rich objects having information of the at least one identified entity;

displaying the sentence suggestion via the user interface; and in response to a selection of the sentence suggestion, providing supplementary information for supplementing the sentence based on at least one selected rich object.

* * * * *